US008123608B2

(12) United States Patent
Moshal

(10) Patent No.: US 8,123,608 B2
(45) Date of Patent: Feb. 28, 2012

(54) GAMING APPARATUS

(75) Inventor: Martin Moshal, Queens Way Quay (GI)

(73) Assignee: Waterleaf Limited, Douglas (IM)

(*) Notice: Subject to any disclaimer, the term of this patent is extended or adjusted under 35 U.S.C. 154(b) by 965 days.

(21) Appl. No.: 10/558,574

(22) PCT Filed: May 25, 2004

(86) PCT No.: PCT/IB2004/001697

§ 371 (c)(1),
(2), (4) Date: Jan. 17, 2007

(87) PCT Pub. No.: WO2004/107083

PCT Pub. Date: Dec. 9, 2004

(65) Prior Publication Data

US 2007/0111781 A1 May 17, 2007
US 2008/0064470 A2 Mar. 13, 2008

(30) Foreign Application Priority Data

May 29, 2003 (GB) .................................. 0312291.8

(51) Int. Cl.
*A63F 13/00* (2006.01)

(52) U.S. Cl. ................ 463/20; 463/16; 463/21; 463/23; 463/25

(58) Field of Classification Search .............. 463/16–21, 463/23, 25
See application file for complete search history.

(56) References Cited

U.S. PATENT DOCUMENTS 6,062,980 A * 5/2000 Luciano .......................... 463/20
6,068,552 A * 5/2000 Walker et al. ................... 463/21
6,241,607 B1 * 6/2001 Payne et al. ..................... 463/20
6,302,791 B1 10/2001 Frohm et al.
2001/0007828 A1 * 7/2001 Walker et al. ................... 463/26
2002/0183105 A1 12/2002 Cannon et al.
2002/0198044 A1 12/2002 Walker et al.
2004/0033825 A1 2/2004 Newton et al.

FOREIGN PATENT DOCUMENTS

CA 2 278 897 A1 1/2001

(Continued)

OTHER PUBLICATIONS

Examiner's first report, dated Mar. 12, 2008, from related Australian Patent Application No. 2004243987.

(Continued)

*Primary Examiner* — Dmitry Suhol
*Assistant Examiner* — Andrew Kim
(74) *Attorney, Agent, or Firm* — McDonnell Boehnen Hulbert & Berghoff LLP

(57) ABSTRACT

A gaming apparatus includes a player terminal operable by a player to simulate a slots game, and a random event generator for generating a random event upon which an outcome of the slots game is based. The slots game has a plurality of successful outcomes, each associated with a corresponding prize. A wagering facility enables the player to place a wager on the occurrence of any specific successful outcome of the slots game, or to make a plurality of different wagers, each corresponding to a different specific one of the successful outcomes of the slots game. The different specific successful outcomes include a favorable outcome and a number of intermediate outcomes. The prize corresponding to the favorable outcome is a jackpot prize. The prize corresponding to an intermediate outcome is repayment of the player's wager at fixed odds inversely proportional to the probability of that intermediate outcome occurring.

7 Claims, 3 Drawing Sheets

FOREIGN PATENT DOCUMENTS

| | | | |
|---|---|---|---|
| CA | 2411054 | A1 | 12/2001 |
| WO | 01/93964 | A1 | 12/2001 |

OTHER PUBLICATIONS

International Search Report for parent application PCT/IB04/01697, issued Oct. 28, 2004, 1 page.

Corrected PCT International Preliminary Report on Patentability for parent application PCT/IB04/01697, issued Dec. 8, 2005, 7 pages.

Fey, Marshall, Slot Machines, A Pictorial History of the First 100 Years, 5th edition, copyright 1997, Liberty Belle Books, Reno, Nevada, pp. 32-35, 70.

Supplementary European Search Report for European Patent Application No. EP 04 73 4708, dated Oct. 21, 2008, 2 pages.

* cited by examiner

10

GAMING APPARATUS

The present application is a filing under 35 U.S.C.§371 of PCT/IB2004/001697, filed on 25 May 2004, which claims priority to U.K. Patent Application GB 0312291.8, filed 29 May 2003.

FIELD OF THE INVENTION

This invention relates to gaming apparatus and, more particularly, to gaming apparatus that enables a player to play a game of chance and to place a wager thereon. The invention extends to a method of operation of the gaming apparatus.

BACKGROUND TO THE INVENTION

Games of chance are known and widely played for recreational purposes. In order to enhance the recreational experience for a player, it is common for the rules of the game to enable the player to place a wager on an outcome of the particular game being played. The wager is paid out at predetermined odds if the outcome of the game is successful, and forfeited by the player of the outcome of the game is unsuccessful. The determination as to whether any wager is successful or unsuccessful is determined according to the rules of the game.

In this specification, the term "gaming apparatus" is taken to include any apparatus on which, or with which, the player may play a game of chance, and associated with which the player may place a wager on an outcome of the game.

The wager may be made with real currency, or with an equivalent of value, such as credits or tokens.

Generally, games of chance are repetitive in nature and consist of sequential cycles, each including the following steps: placing a wager, generating one or more random events, determining whether the wager is successful or unsuccessful as a function of the random events, collecting the wager if unsuccessful, and paying the wager according to predetermined odds if the wager is successful. Examples of such repetitive games are roulette, blackjack, video poker and slots.

The simplest example of the slots game is exemplified in a three-reel slot machine. Each reel of the slot machine is a physical reel and has, say, 30 indexed positions, some of which may display a corresponding indicium to a player of the slot machine. The player is required to place a wager by introducing coins, tokens or credit into the slot machine, which then frees the reels to be spun and to come to rest, randomly, at any of the indexed positions. The spin of each reel thus results in a random event, as described above, and the combination of the three random events constitutes an outcome of the game. The slot machine may be implemented in software, with the random events being generated by a software random number generator. One particular outcome of the slots game usually causes the player to win a prize consisting of a fixed jackpot. A slot machine with the above geometry, namely three reels and 30 positions per reel, provides the player with a 1 in 27 000 chance of winning the fixed jackpot, meaning that, on average, 27 000 outcomes of the game must be determined in order for the jackpot to be won by the player.

In order to take advantage of the random nature of the outcomes of the game, it is known to replace the fixed jackpot by a progressive jackpot in which a proportion of each wager placed by the player of the slot machine is used to increment the jackpot. The randomness makes it possible for the progressive jackpot to become large relative to the fixed jackpot described above, which enhances the attractiveness of the slot machine to would-be players thereof. It must, of course, be appreciated that the randomness also raises the possibility of the progressive jackpot being won when it is small relative to the fixed jackpot.

The slots game has a single favourable outcome, a number of intermediate outcomes, and a plurality of unsuccessful outcomes. When the favourable outcome of the slots game occurs, the player wins the jackpot. When an intermediate outcome occurs, the player's wager is paid at predetermined fixed odds. When an unfavourable outcome occurs, the player's wager is forfeited.

Thus the wager made by the player is a wager on the occurrence of either the favourable outcome, or any one of the intermediate outcomes, the odds at which the wager is paid being inversely proportional to the probability of that outcome occurring.

This method of wagering is unnecessarily restrictive to a player of the slots game. It is desirable to provide a slots game that offers a player wagering choices that are more flexible than those of prior art equivalent games.

OBJECT OF THE INVENTION

It is an object of this invention to provide a gaming apparatus, and a method of operation thereof, that will, at least partially, alleviate the above-mentioned difficulties and disadvantages.

SUMMARY OF THE INVENTION

In accordance with this invention there is provided a gaming apparatus, comprising:

a player terminal operable by a player to simulate a slots game;

a random event generator responsive to the player terminal to generate a random event upon which an outcome of the slots game is based, the slots game having a plurality of successful outcomes, each successful outcome causing the player to win a corresponding prize; and a wagering facility usable by the player to place a wager on the occurrence of any specific successful outcome of the slots game.

Further features of the invention provide for the wagering facility to be usable by the player to make a plurality of different wagers, each one of the plurality of different wagers corresponding to a different specific one of the successful outcomes of the slots game, for the plurality of successful outcomes to include a favourable outcome and a number of intermediate outcomes, for the player's prize corresponding to the favourable outcome to be a fixed jackpot prize or a progressive jackpot prize, and for the player's prize corresponding to an intermediate outcome to be repayment of the player's wager at fixed odds inversely proportional to the probability of that intermediate outcome occurring.

Still further features of the invention provide for the wagering facility to enable the player to make a wager denominated in units of credit, for the wagering facility to enable the player to designate a size of an overall wager, the overall wager being applied as equal wagers on the occurrence of each one of the successful outcomes of the slots game, for the slots game to be a three-reel slots game having about ten successful outcomes, and for the fixed odds of the intermediate outcomes to be between 5:1 and 250:1.

The invention extends to a method of operating a gaming apparatus, comprising the steps of:

simulating a slots game and presenting the simulation to a player of the game, the slots game having a plurality of successful outcomes with each successful outcome causing the player to win a corresponding prize;

enabling the player to place a wager on the occurrence of any specific successful outcome of the slots game; and generating a random event upon which an outcome of the slots game is based.

There is further provided for making a plurality of different wagers, each one of the plurality of different wagers corresponding to a different specific one of the successful outcomes of the slots game, for including in the plurality of successful outcomes a favourable outcome and a number of intermediate outcomes, for making a jackpot, either a fixed jackpot or a progressive jackpot, the prize corresponding to the favourable outcome, and for making repayment of the player's wager at fixed odds the prize corresponding to an intermediate outcome, the odds being inversely proportional to the probability of that intermediate outcome occurring.

There is still further provided for enabling the player to make a wager denominated in units of credit, and for enabling the player to designate a size of an overall wager and applying the overall wager as equal wagers on the occurrence of each one of the successful outcomes of the slots game.

BRIEF DESCRIPTION OF THE DRAWINGS

A preferred embodiment of the invention is described below, by way of example only, and with reference to the accompanying drawings, in which.

DETAILED DESCRIPTION OF THE INVENTION

Figure 1:
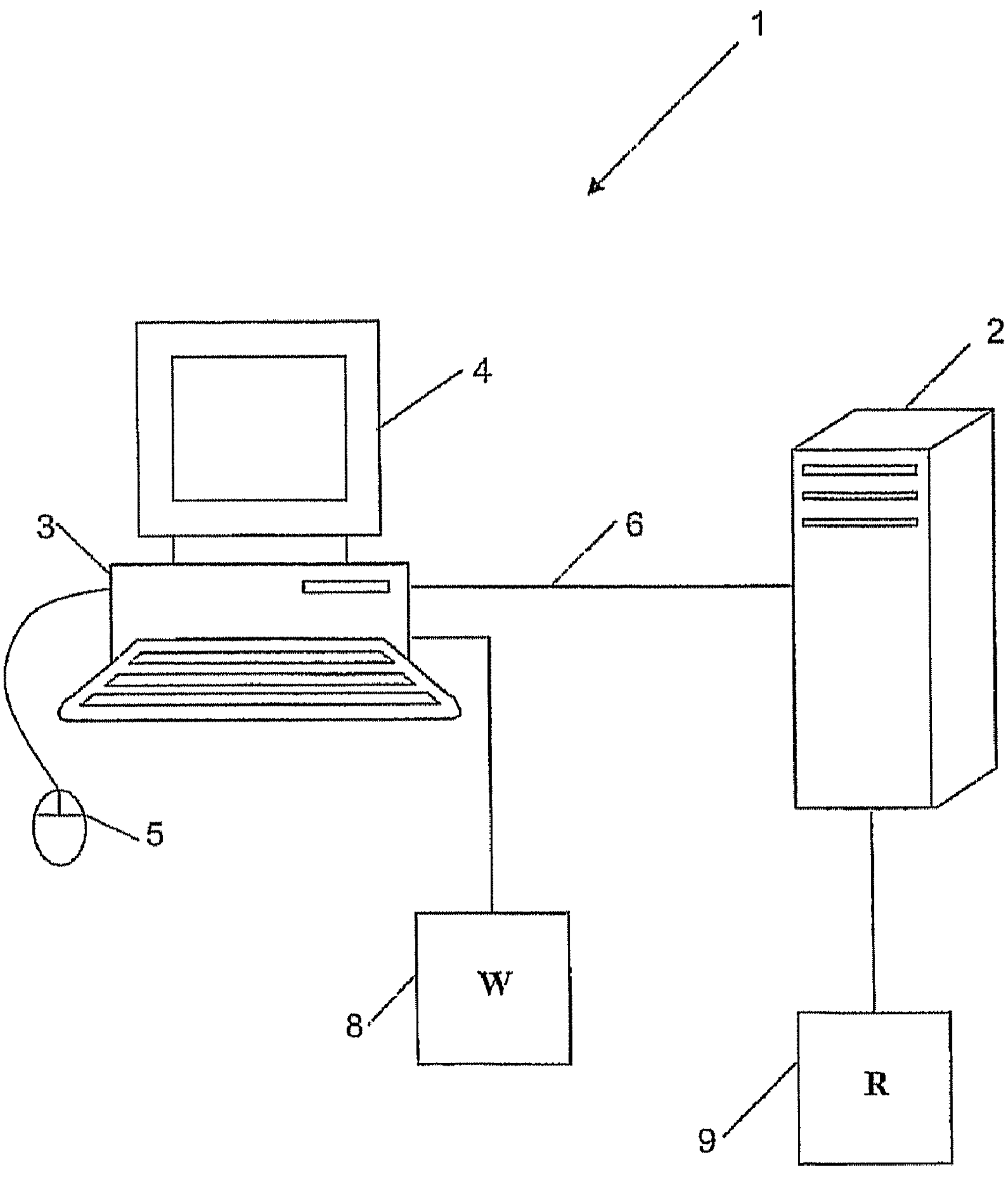
FIG. 1 is a functional representation of a gaming apparatus according to the invention.

Referring to FIG. 1, a gaming apparatus is indicated generally by reference numeral (1).

The gaming apparatus (1) includes a gaming server (2) and a player terminal (3) in the form of a computer workstation with an associated display monitor (4) and a pointing device (5), such as a mouse or a touchpad. The computer workstation (3) is located remotely from the gaming server (2) and communication between the computer workstation and the gaming server is provided across a communication network (6) that is, in this embodiment, the Internet.

Figure 2:
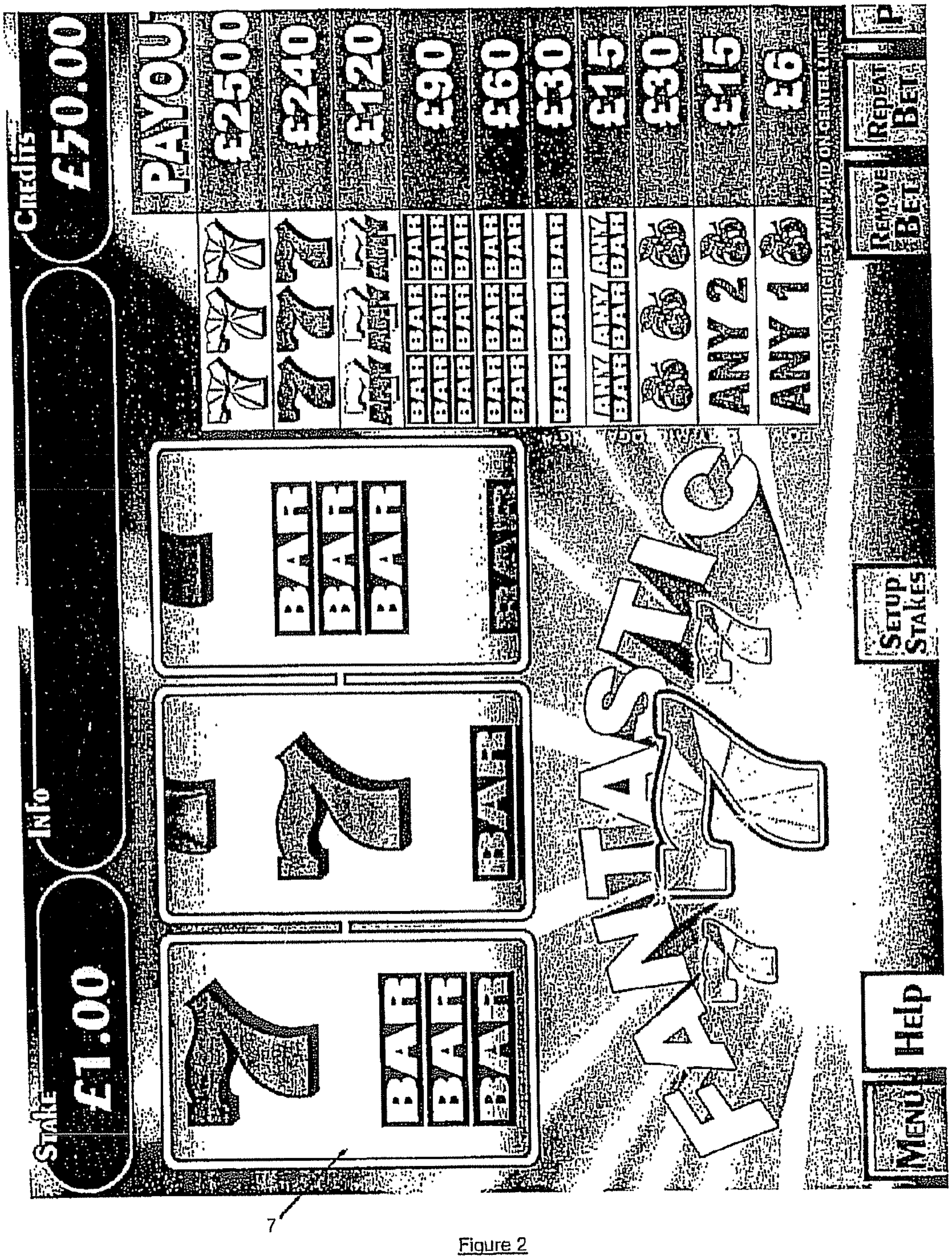
FIG. 2 is a display generated by the gaming apparatus of FIG. 1.
Figure 3:
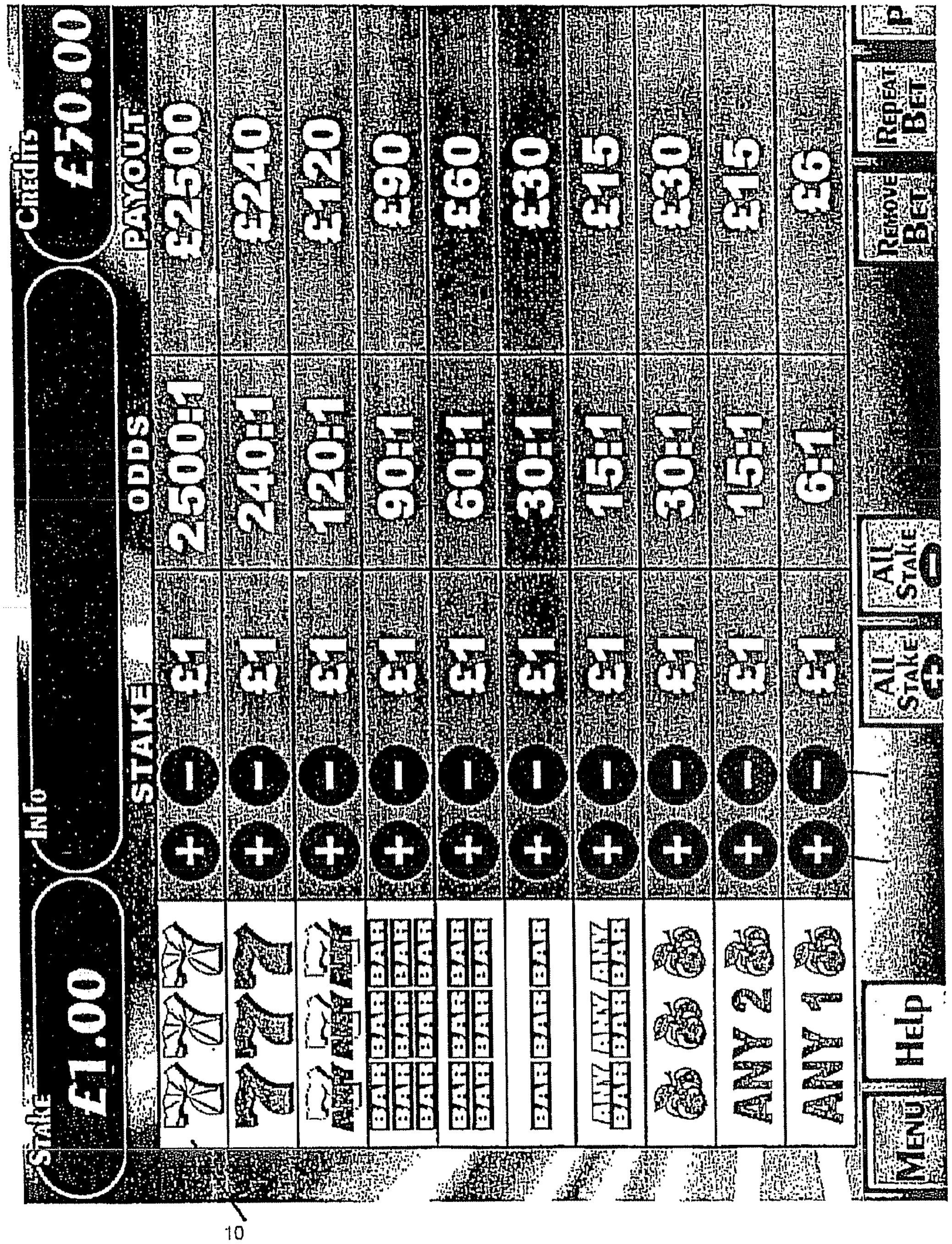
FIG. 3 is a wagering facility of the gaming apparatus of FIG. 1.

The computer workstation (3) is a conventional personal computer operating under a Windows 2000 operating system, which is well known and commercially available from the Microsoft Corporation of Seattle, Wash., USA. The computer workstation executes a simulation software program that simulates the progress of a 3-reel slots game, as represented in FIG. 2. Such a game is well known in the art and the rules of the game will not be described here in detail. The simulation of the slots game displays three reels (7) on the display monitor (4) of the computer workstation (3). The simulation software program also provides a player of the slots game with a wagering facility (8) as represented in FIG. 3. The operation of the simulation program and the wagering facility (8) will be described in detail in the description that follows.

The gaming server (2) includes a random event generator (9) in the form of a computer program that is executable to generate random events upon which an outcome of the slots game is based. As an illustration, if each of the simulated reels (7) of the slots game has 30 indicia displayable thereon, the random event generation program (9) is executable to select, on a random basis, three integers each between 1 and 30 that are displayed on the display monitor (4) of the computer workstation (3) as a corresponding indicium on each of the three simulated reels (7).

As illustrated in FIGS. 2 and 3, each of the 30 indicia displayable on a simulated reel (7) of the slots game is one of a White Space indicium, a "Cherry" indicium, an "ANY BAR" indicium, a "BAR" indicium, a "DOUBLE BAR" indicium, a "TRIPLE BAR" indicium, an "ANY SEVEN" indicium, a "Shaded 7" indicium and an "Embossed 7" indicium, in order of decreasing frequency of occurrence. It will be appreciated that the images shown in FIGS. 2 and 3 are somewhat cropped. As described above, the slots game has 27 000 possible outcomes, of which a plurality are deemed as successful outcomes in that each successful outcome causes the player to win a prize. All the possible successful outcomes are indicated in the table below, in order of increasing probability of occurrence. A prize corresponding to each successful outcome, in the form of odds at which a player's wager is paid on the occurrence of that successful outcome, is also indicated in the table.

| Successful Outcome | Odds |
|---|---|
| 3 Embossed 7s | 2500:1 |
| 3 Shaded 7s | 240:1 |
| 3 ANY SEVENs | 120:1 |
| 3 TRIPLE BARs | 90:1 |
| 3 DOUBLE BARs | 60:1 |
| 3 BARs | 30:1 |
| 3 ANY BARs | 15:1 |
| 3 Cherries | 30:1 |
| 2 Cherries | 15:1 |
| 1 Cherry | 6:1 |

These successful outcomes can be categorised into a favourable outcome, namely that of 3 Embossed 7s, which is the least likely successful outcome, while the remainder of the successful outcomes are intermediate outcomes. The favourable outcome of 3 Embossed 7s can be linked to a jackpot prize, which is either a fixed jackpot or a progressive jackpot.

A player wishing to use the gaming apparatus (1) is first required to register and to create an account on the gaming server (2). The player is then required to pre-fund the account by purchasing credit that will, for convenience, be denominated in this description in "units of credit". The gaming server (2) stores a credit balance corresponding to the player's account at all times.

In order to commence, the player uses the computer workstation (3) to log onto the gaming server (2) and initiates execution of the simulation software program on the computer workstation (3), which displays an appropriate image on the display monitor (4) of three reels (7) of the slots game. The player uses the wagering facility (8) to place a wager on the occurrence of a particular successful outcome. The wagering facility (8) is represented in FIG. 3 and consists of a screen display of an array (10) of all the possible successful outcomes of the slots game, and activatable icons (11) enabling the player to make, to increase, or to decrease independent wagers on any or all of the possible successful outcomes. The player is able, in this manner to make one or more independent wagers on the occurrence of corresponding specific successful outcomes of the slots game. Any wager made by the player is denominated as an integral number of units of credit.

The size of each independent wager made by the player is displayed on the display monitor (4). There must be sufficient credit in the player's account to cover any wager that is made by the player. Data relating to the type and size of all wagers made by the player is transmitted by the computer workstation (3) across the communication network (6) to the gaming server (2). Once this data is received from the computer workstation (3), the random event generator (9) is activated to generate three random numbers as described above, which are then mapped to correspond to an outcome of the slots game. The outcome of the slots game is displayed to the player as corresponding indicia on the reels (7) of the simulation on the display monitor (4). The player's wagers are then adjudicated and successful wagers are settled at the applicable odds illustrated in the table above.

Prior art slots gaming apparata enable a player to make a single wager which will win a prize upon the occurrence of any one of the possible successful outcomes of the slots game, with the odds at which the player's wager is paid being a function of the particular outcome that occurred. In contradistinction the present invention enables a player to place a wager on the occurrence of any specific successful outcome of the slots game. Further, the player may make multiple independent wagers on the occurrence of corresponding different specific successful outcomes of the game. It is a design criterion of prior art slots gaming apparata that the payout table as a whole be profitable for an operator of the slots game. It will be appreciated by those skilled in the art, however, that the invention necessitates that each specific type of wager in slots gaming apparata according to the invention should be profitable in its own right for an operator of the slots game.

Numerous modifications are possible to this invention without departing from the scope of the invention. In particular, the number of reels of the slots game may be different in number to the three reels described in this embodiment. Further, the number of successful outcomes of the slots game may be increased or decreased from the number of 10 successful outcomes illustrated in this embodiment. Still further, the wagering facility (8) may enable the player to select a size of an overall wager to be placed on a turn of the slots game, with the overall wager being applied as equal wagers on the occurrence of each one of the ten successful outcomes illustrated above. Yet further, the gaming apparatus (1) may be implanted as a stand-alone gaming apparatus of a type that is commonly found in land-based casinos, instead of being implemented by means of a client-server architecture described above.

The invention therefore provides a gaming apparatus that provides a player of a slots game with increased wagering functionality relative to prior art slots gaming apparatus.

The invention claimed is:

1. A gaming apparatus, comprising:

a player terminal operable by a player to simulate a multi-reel slots game, the multi-reel slots game having a set of possible outcomes corresponding to the possible combinations of indicia displayable on the simulated reels, the set of possible outcomes including a plurality of independently selectable outcomes;

a wagering facility operable to display, for each independently selectable outcome on which the player has placed a wager for a turn of the game, (i) an activatable icon that enables the player to adjust the wager on the independently selectable outcome, (ii) the size of the wager on the independently selectable outcome, (iii) odds for the independently selectable outcome, and (iv) a payout for the wager on the independently selectable outcome, wherein the player wins the payout if the independently selectable outcome occurs during the turn of the game and loses the wager if the independently selectable outcome does not occur during the turn of the game, wherein the wagering facility is further operable to display in one screen all of the independently selectable outcomes and their respective activatable icons, wagers, odds, and payouts; and wherein the player terminal is operable to display to the player an outcome of the turn of the slots game from the set of possible outcomes, wherein the outcome is randomly determined.

2. The gaming apparatus of claim 1, wherein the plurality of independently selectable outcomes includes a favorable outcome and a number of intermediate outcomes, and wherein the favorable outcome is associated with a fixed jackpot prize or a progressive jackpot prize.

3. The gaming apparatus of claim 2, wherein an intermediate outcome is associated with a prize corresponding to repayment of the player's wager at fixed odds inversely proportional to the probability of that intermediate outcome occurring.

4. The gaming apparatus of claim 3, wherein the multi-reel slots game is a three-reel slots game having a pay table with about ten independently selectable outcomes, including a plurality of intermediate outcomes with fixed odds between 5:1 and 250:1.

5. A method of operating a gaming apparatus, the method comprising:

a player terminal simulating a multi-reel slots game and presenting the simulation to a player of the game, the multi-reel slots game having a set of possible outcomes corresponding to the possible combinations of indicia displayable on the simulated reels, the set of possible outcomes including a plurality of independently selectable outcomes;

a wagering facility displaying, for each independently selectable outcome on which the player has placed a wager for a turn of the game, (i) an activatable icon that enables the player to adjust the wager on the independently selectable outcome, (ii) the size of the wager on the independently selectable outcome, (iii) odds for the independently selectable outcome, and (iv) a payout for the wager on the independently selectable outcome, wherein the player wins the payout if the independently selectable outcome occurs during the turn of the game and loses the wager if the independently selectable outcome does not occur during the turn of the game;

the wagering facility displaying in one screen all of the independently selectable outcomes and their respective activatable icons, wagers, odds, and payouts; and the player terminal displaying to the player an outcome of the turn of the slots game from the set of possible outcomes, wherein the outcome is randomly determined.

6. The method of claim 5, wherein the plurality of independently selectable outcomes includes a favorable outcome and a number of intermediate outcomes and a jackpot prize is associated with the favorable outcome.

7. The method of claim 6, wherein a prize corresponding to the occurrence of an intermediate outcome is repayment of the player's wager at fixed odds inversely proportional to the probability of that intermediate outcome occurring.

* * * * *